(12) United States Patent
Brkovic (10) Patent No.: US 6,724,642 B2
(45) Date of Patent: Apr. 20, 2004

(54) METHOD AND APPARATUS FOR PROVIDING AN INITIAL BIAS AND ENABLE SIGNAL FOR A POWER CONVERTER

(75) Inventor: Milivoje S. Brkovic, Carlsbad, CA (US)

(73) Assignee: di/dt, Inc., Carlsbad, CA (US)

( * ) Notice: Subject to any disclaimer, the term of this patent is extended or adjusted under 35 U.S.C. 154(b) by 127 days.

(21) Appl. No.: 10/085,363

(22) Filed: Feb. 28, 2002

(65) Prior Publication Data

US 2002/0122320 A1 Sep. 5, 2002

Related U.S. Application Data

(60) Provisional application No. 60/272,551, filed on Mar. 1, 2001.

(51) Int. Cl.[7] .............................................. H02M 3/335
(52) U.S. Cl. ...................................... 363/21.08; 363/49
(58) Field of Search ........................... 363/20, 21.04, 363/21.07, 21.08, 49; 323/901

(56) References Cited

U.S. PATENT DOCUMENTS

| | | | | |
|---|---|---|---|---|
| 4,180,852 A | * | 12/1979 | Koizumi et al. | ............... 363/49 |
| 4,623,960 A | * | 11/1986 | Eng | ........................ 363/21.08 |
| RE34,462 E | * | 11/1993 | Whittle | ........................ 363/49 |
| 5,579,202 A | * | 11/1996 | Tolfsen et al. | ............... 361/232 |
| 6,434,025 B2 | * | 8/2002 | Shirai et al. | ............... 363/21.1 |

OTHER PUBLICATIONS

S.Y.R. Hui et al., Coreless PCB-based transformers for Power MOSFET/tGBT Gate Drive Circuits, 1997 IEEE Pesc, pp. 1171-1178, No Month.

\* cited by examiner

*Primary Examiner*—Michael Sherry
*Assistant Examiner*—Gary l. Laxton
(74) *Attorney, Agent, or Firm*—Lowenstein Sandler PC (57) ABSTRACT

The invention employs a coreless isolated transformer, with associated electronic circuitry, for providing an initial bias and enable signal for control and drive circuitry that is referenced to the output of a converter. The improvement is accomplished by embedding the transformer primary and secondary windings into a multi-layer PCB so that the transformer does not occupy space on the top and bottom surfaces of the PCB The initial bias voltage is used to initialize operation of the control circuit when referenced to the output side of the converter. Thus, complete regulation and drive signals are generated on the output side.

31 Claims, 6 Drawing Sheets

METHOD AND APPARATUS FOR PROVIDING AN INITIAL BIAS AND ENABLE SIGNAL FOR A POWER CONVERTER

CROSS REFERENCE TO RELATED APPLICATION

This is a non-provisional application based on provisional application Ser. No. 60/272,551, filed Mar. 1, 2001.

BACKGROUND

1. Field of Invention

This invention generally concerns isolated converter circuitry and more particularly relates to means for providing an initial bias and an enable signal for the control circuit referenced to the output of converter.

2. Background Discussion

It is a common problem in isolated converters to provide a proper bias for both primary and output circuitry, particularly during start-up or restart of the converter. Usually a controller (pulse width modulated (PWM) is one example) is on the input side and the feedback signal is provided via an opto-coupler, while synchronous rectifiers are self-driven from the transformer windings. There are two drawbacks in using this approach. First, the use of an opto-coupler generally limits the bandwidth of the regulation loop and the maximum ambient temperature and temperature of the printed circuit board (PCB) to less than about 85° C. Secondly, the self-driven synchronous approach is generally not a good solution for higher frequencies.

In addition, protection such as over-voltage protection (OVP) has to be on the output side, which may require an additional opto-isolator just for over-voltage protection. Therefore, there is an advantage to having the control circuit on the output side. The major problem is to provide the necessary initial bias voltage before the converter is started. One possible solution is to have a separate isolated converter that will provide the bias voltage. Such a solution would require an additional magnetic core and, if realized employing planar magnetics, would consume a lot of board space.

SUMMARY OF THE INVENTION

The present invention provides a solution to the above problems. The apparatus of the invention employs a coreless isolated transformer, with associated electronic circuitry, for providing initial bias and enable signal for the control and drive circuitry referenced to the output of a converter. The improvement is accomplished by embedding the transformer primary and secondary windings into a multi-layer PCB so that the transformer does not occupy space on the top and bottom surfaces of the PCB The initial bias voltage is needed to initialize operation of the control circuit when referenced to the output side of the converter. Thus, complete regulation and drive signals are generated on the output side.

A coreless transformer does not use any magnetic core as do typical transformers. It is, therefore, important to provide, as best as possible, coupling between the primary and secondary windings with proper geometry and stack-up on the PCB. Magnetic coupling is through air so this structure will have small magnetizing inductance and large leakage inductance. The former imposes a limitation on volt-seconds that can be applied across the windings of the transformer, while the latter requires a proper turns ratio that would compensate for leakage inductance. In addition, by proper geometry (construction) of the windings of the coreless transformer, as well as stack-up of the PCB, leakage inductance can be minimized in order to achieve higher effective (actual) turns ratio.

Also, this transformer is optimized to operate at higher frequencies, for example, 500 kHz and above. Since there is no magnetic core, inductance of the winding of the coreless transformer is very small. Due to this fact, higher frequency operation is necessary to achieve reasonable usage, size and efficiency of the coreless transformer. It can be used in different ways:

a) To operate all the time, in which case it provides the necessary bias for the circuitry on the output side of the converter; or b) To operate only for predetermined periods of time during start-up or re-start after fault conditions such as over-current or over-voltage protection, among others.

This mode is preferred, because of the low efficiency of the coreless transformer caused by relatively large magnetizing current.

BRIEF DESCRIPTION OF THE DRAWING

The objects, advantages and features of the invention will be more clearly perceived from the following detailed description, when read in conjunction with the accompanying drawing which illustrate by way of example the principles of the invention, in which.

DETAILED DESCRIPTION OF THE PREFERRED EMBODIMENTS

Figure 1:
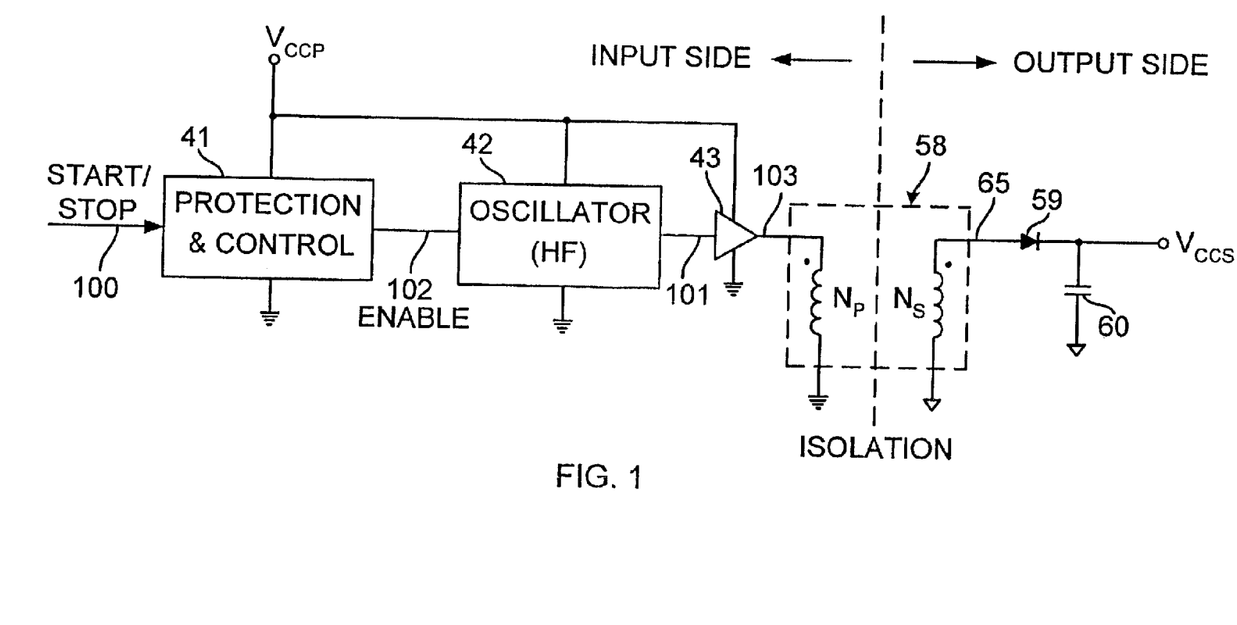
FIG. 1 is a functional diagram of a bias circuit using a coreless transformer with isolation, in accordance with an embodiment of the invention.

With reference now to the drawing and more particularly to FIG. 1, the initial bias circuit according to an embodiment of the invention comprises oscillator 42, driver 43, coreless isolation transformer 58, rectifying diode 59 and capacitor 60. Oscillator 42 is controlled with ENABLE input signal 102, usually generated by protection and control circuit 41 referenced to the input side of the converter. With START/STOP signal 100 active, protection and control circuit 41 generates ENABLE signal 102 coupled to oscillator 42. When signal 102 is active (logic high, for example), oscillator 42 is enabled, and generates high frequency (for example, 500 kHz and above) output pulses 101 of short duration. The frequency of pulses 101 is preferably at least about 500 kHz with a duration of, for example, about 100 nanoseconds. The short pulses 101 are fed into driver 43 which, in turn, drives coreless isolation transformer 58 via primary winding $N_P$ referenced to the input side of the converter. The pulses from secondary winding $N_S$, being referenced to the output side of the converter, are rectified by diode 59 and fed into capacitor 60 which is charged to the voltage $V_3$ level of voltage $V_{CCS}$ (the (E) curve of FIG. 3), at time t=$t_1$. The level $V_3$ of voltage $V_{CCS}$ is chosen to be higher than the start-up voltage of controller 602 and driver 601, respectively, in FIG. 2, reference to output side of the converter.

Figure 2:
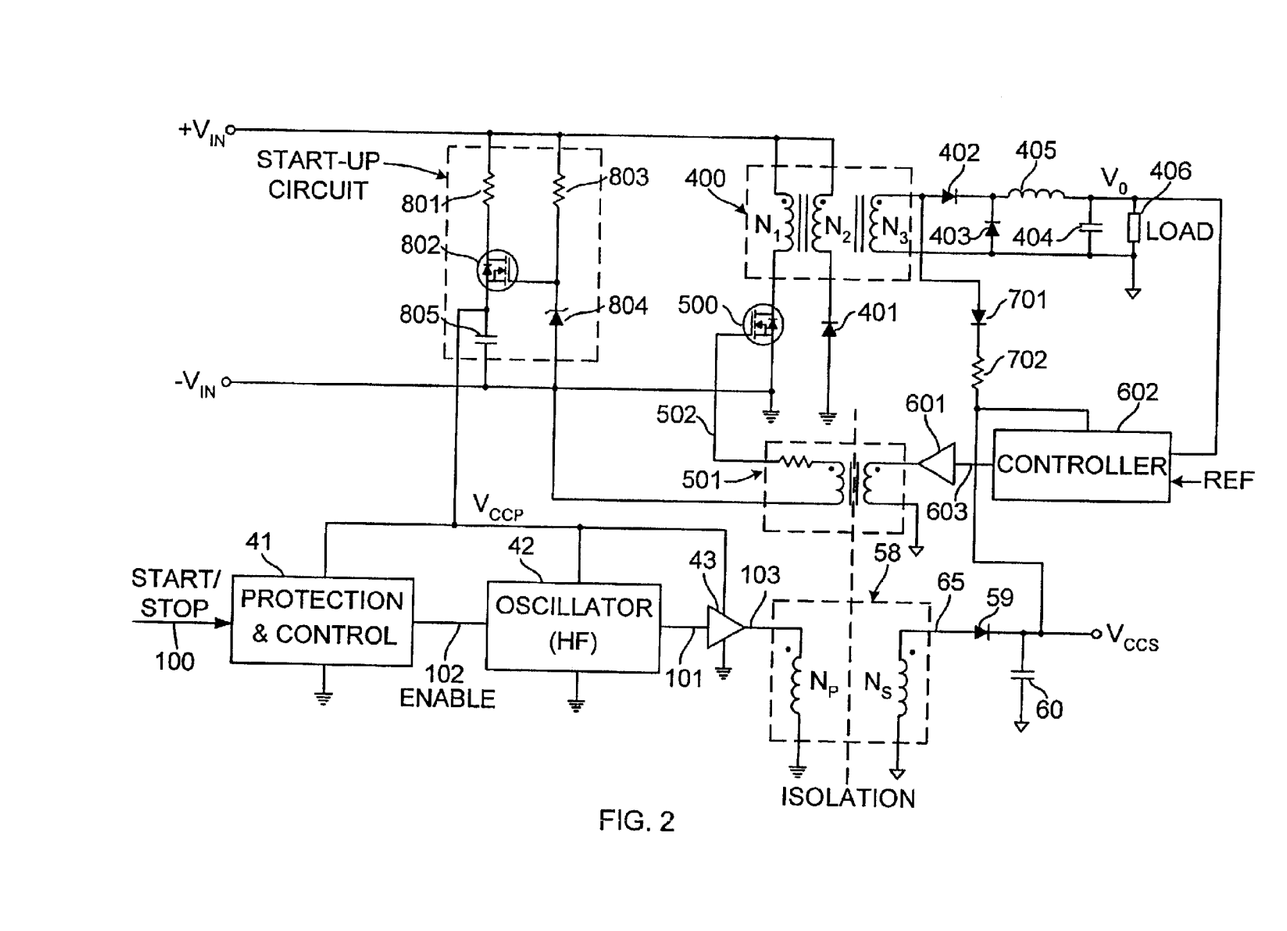
FIG. 2 is a schematic diagram of an isolated dc-to-dc converter using the bias circuit with the coreless transformer of FIG. 1 for initial bias for control and drive circuitry referenced to the output of the converter, in accordance with an embodiment of the invention.

An isolated dc-to-dc converter using the invention of FIG. 1 is shown in FIG. 2. The converter could be also ac-to-dc or dc-to-ac. A forward converter is used as an example, but the invention is not limited to any particular topology. The forward converter comprises primary power controllable switch 500, isolation power transformer 400, rectifiers 402 and 403, output inductor 405 and output capacitor 404. Note that synchronous rectifiers, such as MOSFETS, could be used instead of rectifying diodes 402 and 403. The start-up circuit, comprising resistors 801, 803, transistor 802 (shown as a MOSFET, for example), Zener diode 804 and capacitor 805, is conventional. Diode 701 is connected with one end to winding $N_3$ and with its other end to resistor 702. These two components, together with winding $N_3$, provide bias voltage for control circuit 602 on the output side of the converter, once the converter has started. Note that an additional winding, having the same function for providing a bias voltage as winding $N_3$ (shown in FIG. 2 as one possible solution), could be added either as a separate winding to isolation power transformer 400 or as a separate winding coupled to output inductor 405, either of which is a very common practice.

For forward converter operation, when transistor 500 is on, a positive voltage is applied across windings $N_1$ and $N_3$ of power isolation transformer 400. Rectifier diode 402 is forward biased and current flows into inductor 405 and charges capacitor 404, supplying load 406. When transistor 500 is off, the voltages on windings $N_1$ and $N_3$ reverse polarity while the voltage on winding $N_2$ becomes positive and transformer 400 is reset via forward bias diode 401. Here, the reset method is shown as an example only. It could be accomplished by any other known means, including active reset. With winding $N_3$ having reversed polarity, diode 402 is reverse biased, diode 403 is forward biased and inductor 405 discharges into capacitor 404 and load 406 via diode 403.

The start-up circuit operates in the following manner. Capacitor 805 is charged via transistor 802 and resistor 801 to a voltage equal to the difference between the voltage of Zener diode 804 and the threshold voltage of transistor 802. Resistor 803 provides bias current for Zener diode 804 and transistor 802. The start-up circuit provides voltage $V_{CCP}$, which supplies protection and control circuit 41 on the input side of the converter, and also supplies the initial bias circuit which comprises oscillator 42, driver 43, coreless isolation transformer 58, diode 59 and capacitor 60.

Operation of the converter in FIG. 2 is initialized with START/STOP signal 100 which activates protection and control circuit 41 which then generates ENABLE signal 102 to initiate oscillator 42. As described above, oscillator 42 generates narrow pulses with repetition rate $T_S$, typically an order of magnitude longer than the pulse duration $t_p$ ($T_S \gg t_p$ of pulse train (C) in FIG. 3), which are fed into driver 43. Coreless isolation transformer 58 is driven by driver 43 with pulses 103 similar to pulses 101. When a positive voltage pulse is applied across winding $N_P$ of transformer 58 (the end of winding $N_P$ marked with a dot is positive with respect to input side return $-V_{IN}$), the voltage on winding $N_S$ is also positive (the end with a dot is positive with respect to the other end) and diode 59 is forward biased. Capacitor 60 charges every time a positive voltage is applied across windings $N_P$ and $N_S$ and after time t=$t_1$ reaches its maximum value $V_3$. This value $V_3$ is chosen to be higher than the start-up voltage for controller 602 by proper choice of turns ratio $N_S/N_P$, pulse width $t_d$ and period $T_S$ of pulses 103, and voltage $V_{CCP}$.

Figure 3:
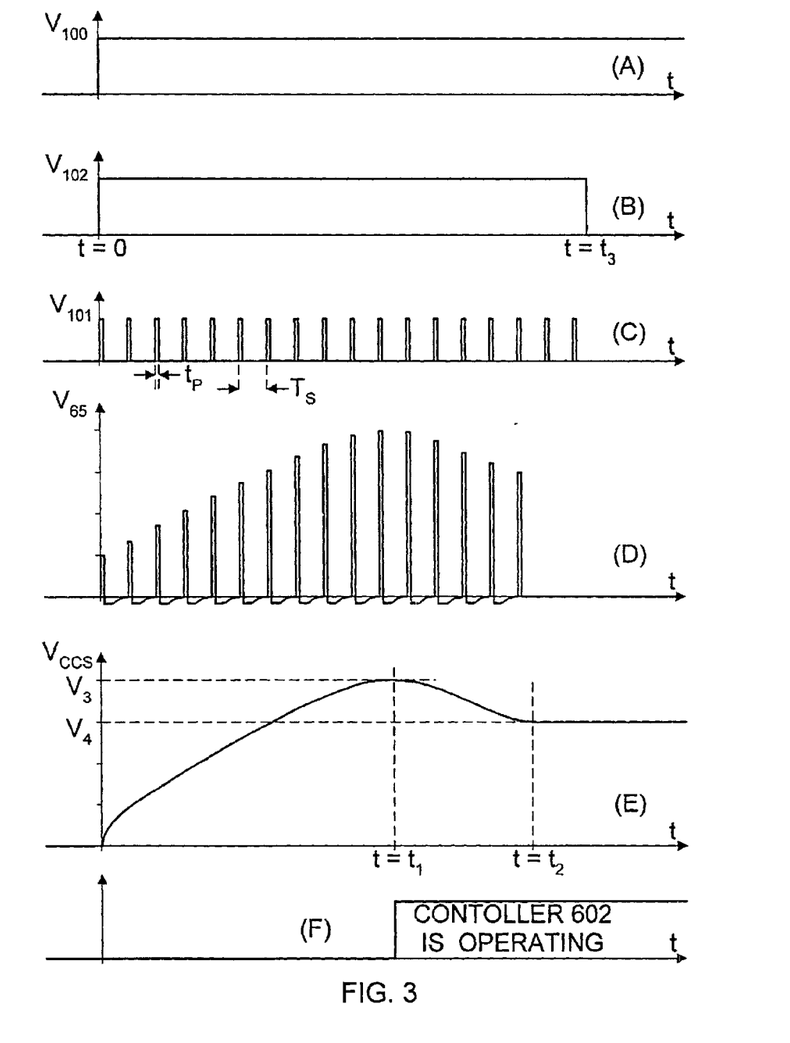
FIG. 3 shows salient waveforms of the circuit of FIG. 1.

When ENABLE signal 102 is in active state, oscillator 42 is enabled and starts generating pulses 101 for driver 43, which drives coreless isolation transformer 58. The relevant waveforms are shown in FIG. 3. Diode 59 rectifies positive pulses from secondary winding $N_S$ of transformer 58, and capacitor 60 charges to a predetermined voltage. Controller 602 is disabled until the voltage on capacitor 60, $V_{CCS}$, reaches its start-up threshold (at time t=$t_1$). After that, controller 602 starts operating and generates drive signal 603 for primary power switch 500 via, in this example, drive transformer 501. As soon as controller 602 starts operating, the voltage on capacitor 60 starts dropping until the voltage on winding $N_3$ is high enough so that diode 701 becomes forward biased and charges capacitor 60 via current limiting resistor 702. The voltage on capacitor 60 drops until it reaches its steady state value $V_4$ at time t=$t_2$, determined by the amplitude of the voltage on winding $N_3$ minus the forward voltage drop across diode 701 and the voltage drop across resistor 702. In one embodiment oscillator 42 is disabled after a predetermined time (t=$t_3$ in FIG. 3) after voltage $V_{CCS}$ reaches its steady state value $V_4$, and bias voltage $V_{CCS}$ for controller 602 and driver 601 is provided after this time only from winding $N_3$ of power isolation transformer 400. Note that during time interval $t_3$-$t_2$ bias voltage is provided from both coreless isolation transformer 58 and winding $N_3$.

Figure 4A:
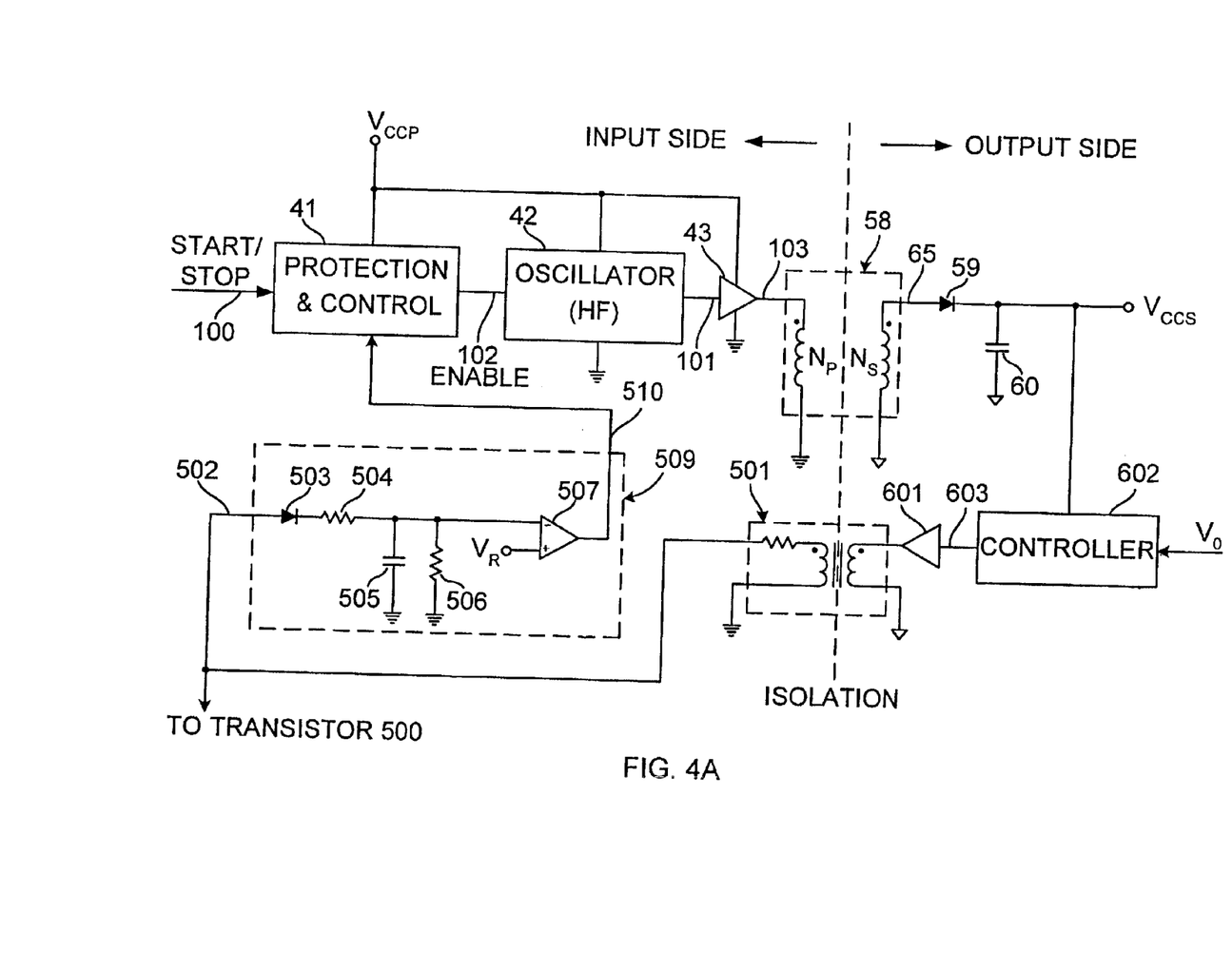
FIG. 4A is a partial schematic diagram of an alternative embodiment of the bias circuit of FIG. 1.

In another embodiment of invention as shown in FIG. 4A, the time at which oscillator 42 is disabled is determined from drive signal 502, based on the amplitude and width of positive pulses applied to transistor 500 (see FIG. 2). In this manner oscillator 42 is disabled before predetermined time t=$t_3$ very soon after controller 602 commences operating and generating drive signal 502, which may be in the form of short pulses. One possible circuit implementation is shown in FIG. 4A, where additional circuit 509, comprising diode 503, resistor 504, capacitor 505 and resistor 506, receives voltage pulses 502 from the gate of transistor 500. The voltage on capacitor 505 depends on the amplitude and duration of voltage pulses 502, the capacitance of capacitor 505, and resistance of resistors 504 and 506. The voltage on capacitor 505 is compared with reference voltage $V_R$ in comparator 507 and, when the voltage on capacitor 505 exceeds reference voltage $V_R$, comparator 507 generates logic low signal 510 on its output which is fed into protection and control circuit 41 and oscillator 42 becomes disabled. Note that even when the circuit of FIG. 4A is used, it is advantageous to disable oscillator 42 after predetermined time t=$t_3$ if controller 602, and consequently the converter, is not operating or the voltage on winding N3 (FIG. 2) is not big enough to provide bias voltage $V_{CCS}$. Such conditions could be, for example, if over-current protection is activated, in which case the converter may operate with a very small duty cycle and consequently very narrow voltage pulses 502 will not trip comparator 507 (FIG. 4A) and narrow pulses on winding $N_3$ (FIG. 2) will not be enough to provide the minimum voltage on capacitor 60 needed for operation of controller 602.

It is very common in practice that in event of activating either some or all protection (such as short circuit, over-current, over-voltage and over-temperature, for example), a converter enters so-called hiccup mode. In this mode the converter tries to re-start with a predetermined period of operation in the event the converter is automatically shut down due to the existence of a protection condition. Protection and control circuit 41 is designed to generate ENABLE signal 102 which will be a pulse train rather than the single pulse waveform (B) of FIG. 3. For example, in the embodiment shown, the pulse duration is about 5 msec with an inactive duration of about 95 msec, for a total pulse period of about 100 msec. The status of signal 510 from circuit 509 (shown in FIG. 4A) determines if protection and control circuit 41 will generate ENABLE signal 102 as a pulse train. Whenever the ENABLE signal is active, capacitor 60 will be charged to voltage level $V_3$, controller 602 will be enabled and the converter will attempt to start again. If the converter does not start, or if it shuts down again due to a protection condition, circuit 509 detects that there is no drive signal 502 for transistor 500 (FIG. 2) and generates logic low signal 510 which initiates an inactive period in protection and control circuit 41. Oscillator 42 will be inactive for the remaining 95 msec. At the end of the inactive period, control and protection circuit 41 generates logic high ENABLE signal 102 and the converter tries to re-start. It is also possible by using the described embodiment to have on/off control referenced to the output side of the converter. Note that the duration of active and inactive periods are given as examples only, and can be adjusted according to any particular application.

Figure 4B:
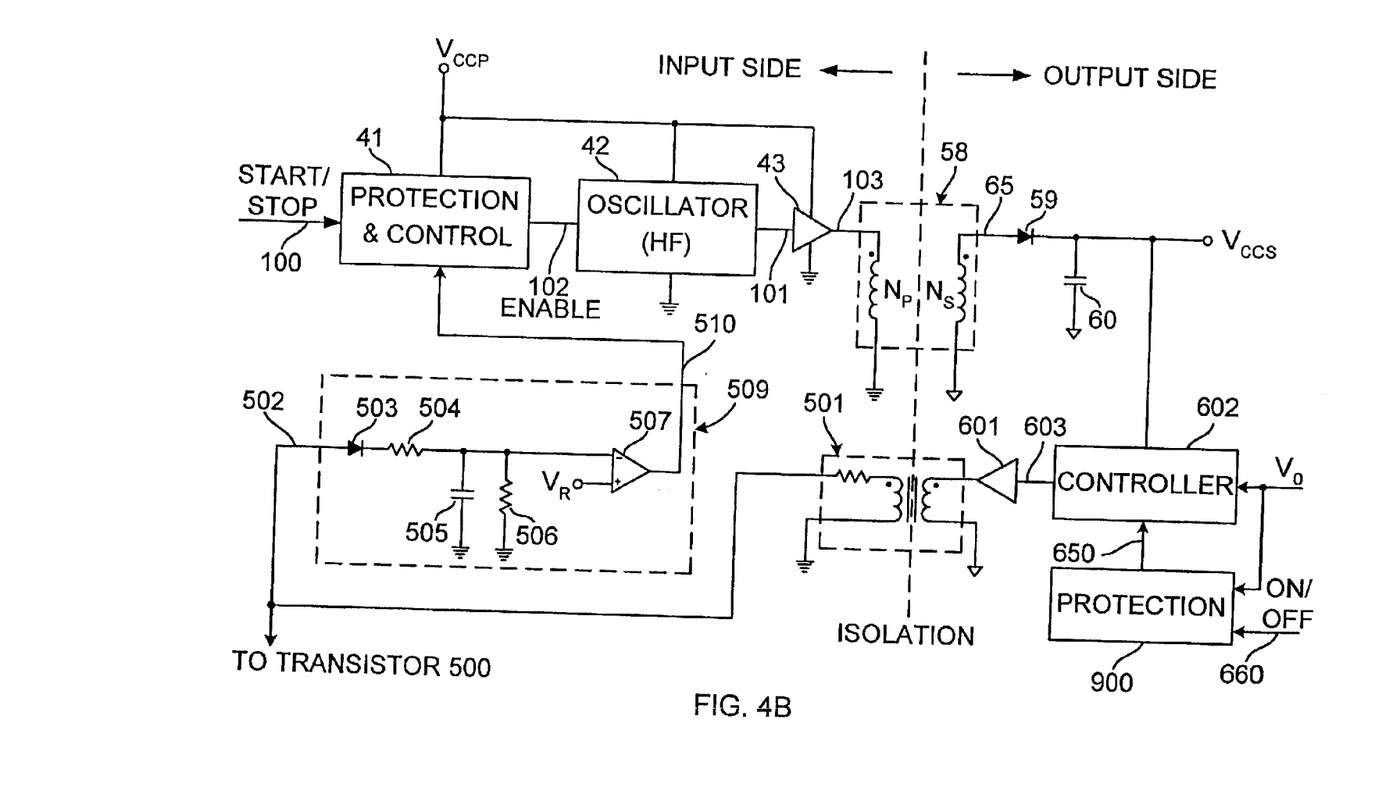
FIG. 4B is a partial schematic diagram of another alternative embodiment of the bias circuit of FIG. 1.

In still another embodiment of invention, shown in FIG. 4B, the converter is enabled with ON/OFF signal 660 referenced to the output side of the converter. Protection circuit 900 enables/disables controller 602 with signal 650. In order to have on/off control from the output side, START/STOP signal 100 is active, thus enabling protection and control circuit 41 which generates ENABLE signal 102 as a pulse train rather than as a single pulse waveform, as described above in case of the hiccup mode of operation. Note that the initial bias circuit also provides voltage $V_{CCS}$ for protection circuit 900. When ON/OFF signal 660 becomes active and controller 602 is enabled, the converter enters its normal mode of operation as described above. Note that the inactive period of ENABLE signal 102 determines maximum turn-on time of the converter.

Figure 5:
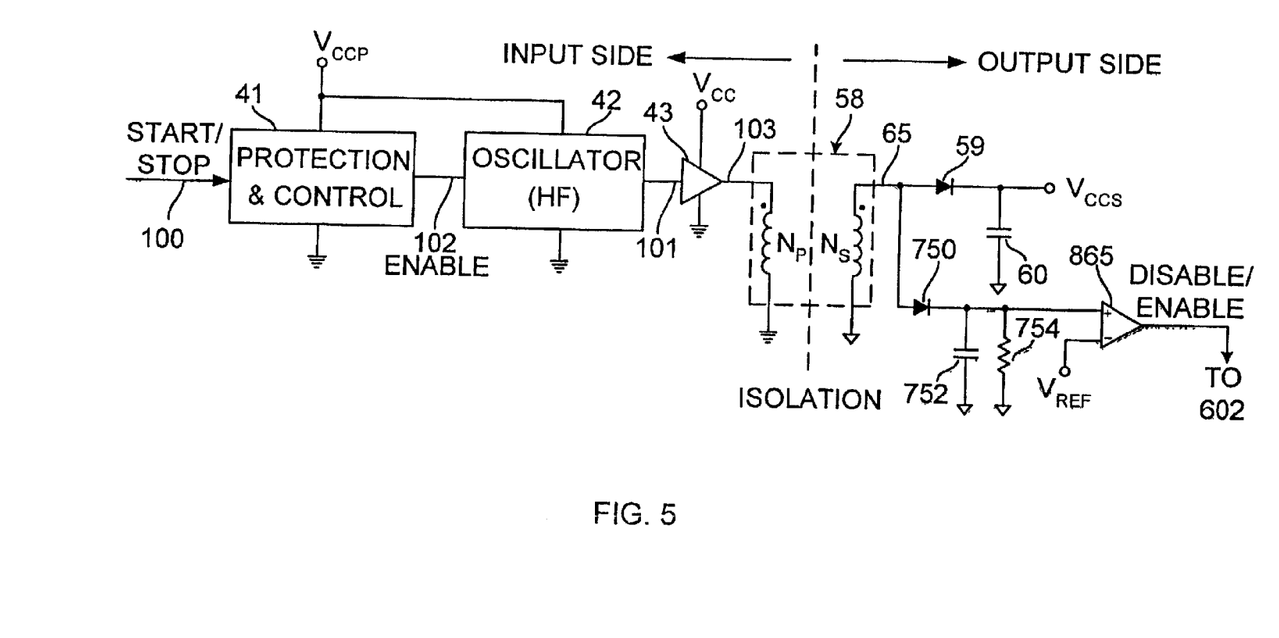
FIG. 5 is a partial schematic diagram of yet another alternative embodiment of the bias circuit of FIG. 1.

It is additionally advantageous in isolated converters to provide an enable/disable signal referenced to the input side of the converter that initiates or disables controller 602 referenced to the output of converter, for example in case of input voltage under- and over-voltage protections or turning-on or turning-off the converter, as illustrated by FIG. 5.

With reference now to the circuit of FIG. 5, when protection and control circuit 41 is enabled, oscillator 42 is enabled and the bias circuit operates as described above, but now continuously. After the initial time $t=t_3$, the frequency of oscillator 42 is changed, for example, it may be reduced, or supply voltage $V_{CC}$ (which is different than $V_{CCP}$) for driver 43 can be reduced, or both simultaneously, in order to minimize power consumption while still providing pulses on secondary windings $N_S$ of coreless isolation transformer 58. By detecting positive pulses from winding $N_S$ with the peak detector circuit comprising diode 750, capacitor 752 and resistor 754, the output side control circuit gets information that the module is enabled from the input side.

The time constant defined by capacitor 752 and resistor 754 is chosen such that the voltage across capacitor 752 decays in a predetermined time, which could be as low as the switching period of the converter. Comparator 865 senses the voltage across capacitor 752 and disables controller 602 (FIG. 2) whenever the sensed voltage is below $V_{ref}$. A smaller time constant will provide a shorter delay of disabling controller 602. Note that as long as oscillator 42 is enabled, there is voltage across capacitor 752 that is higher than $V_{REF}$, controller 602 is enabled and consequently the converter is enabled from the input side. Once the voltage across capacitor 752 drops below threshold voltage $V_{REF}$, comparator 865 generates a disable signal for controller 602. In this manner, an on/off feature referenced to the input side is sensed on the output side by the disabling of controller 602. By disabling oscillator 42 on the input side, and sensing the voltage drop on capacitor 752 on the output side, the on/off function is transferred from the input side to the controller on the output side of the converter.

It should be understood that the foregoing embodiments are exemplary for the purpose of teaching the inventive aspects of the present invention that are covered solely by the appended claims and encompass all variations not regarded as a departure from the intent and scope of the invention. All such modifications as would be obvious to one of ordinary skill in the art are intended to be included within the scope of the following claims and their equivalents.

What is claimed is:

1. A bias circuit used in a switch-mode power converters having an input and an output side, the bias circuit providing initial bias power to a control circuit located on the output side of the switch-mode power converter, the bias circuit comprising:
   an isolated coreless transformer, the transformer having windings, the windings formed in or on layers of a printed circuit board (PCB);
   a driver coupled to the transformer, wherein the driver, when enabled by an enable signal, drives the coreless transformer with high frequency pulses of short duration;
   a rectifier coupled to the output of the transformer to provide pulses;
   a capacitor coupled to the rectifier to smooth the rectified pulses into a voltage, and providing the power to the control circuit located on the output side of said of the converter during startup.

2. The bias circuit recited in claim 1, wherein said driver comprises:
   an oscillator that generates high frequency pulses of short duration, wherein the driver, when enabled, drives said coreless transformer in response to the output of said oscillator.

3. The bias circuit recited in claim 1, and further comprising an ON/OFF feature, wherein said ON/OFF feature comprises apparatus to disable said coreless transformer and thus the control circuit located on the output side in response to a signal initiated on the input side.

4. The bias circuit recited in claim 1, and further comprising apparatus to disable said coreless transformer and thus said control circuit in response to a signal initiated on the output side.

5. The bias circuit recited in claim 1, wherein the enable signal is a single pulse of predetermined duration.

6. The bias circuit recited in claim 1, wherein the enable signal is a train of pulses of predetermined duration and predetermined period.

7. The bias circuit recited in claim 6, wherein the predetermined duration of each said pulse in the enable signal is short compared with the period of the pulses.

8. The bias circuit recited in claim 1, wherein the enable signal is a single pulse, the duration of which is determined by the time from the commencement of the enable signal until said converter commences operating.

9. The bias circuit recited in claim 8, wherein the enable signal has a predetermined inactive period following the duration of the single pulse.

10. The bias circuit recited in claim 2, wherein said oscillator operates continuously at a reduced frequency after a predetermined time.

11. The bias circuit recited in claim 2, wherein said oscillator operates continuously at a reduced frequency after said converter commences operating.

12. The bias circuit recited in claim 1, wherein the voltage is reduced after a predetermined time.

13. The bias circuit recited in claim 1, wherein the voltage is reduced after said converter commences operating.

14. The bias circuit recited in claim 1, and further comprising a sensor on the output of said coreless transformer, said sensor disabling said control circuit pursuant to sensing that said coreless transformer has no output.

15. The bias circuit recited in claim 1, and further comprising a sensing and control circuit coupled to the input side of said bias circuit to detect when said converter is not operating, said sensing and control circuit commencing a short active period where the control circuit located on the output side is enabled followed by a relatively long inactive period.

16. A bias circuit used in switch-mode power converters having an input and an output side, the bias circuit providing initial power to a control circuit located on the output side of the switch-mode power converter, the bias circuit comprising:
an isolated coreless transformer, the transformer having windings, the windings formed on layers of a printed circuit board (PCB), wherein the driver, when enabled by an enable signal, drives the coreless transformer with high frequency pulses of short duration;
driving means for driving said coreless transformer; rectifier means for providing pulses at the output of said coreless transformer;
capacitor means for smoothing the rectified, the smoothed rectified pulses generating a voltage for powering said control circuit located on the output side of said switch-mode power converter at startup.

17. The bias circuit recited in claim 16, wherein said driving means comprises:
oscillator means that generates high frequency pulses of short duration, the driving means for driving said coreless transformer in response to the output of said oscillator.

18. The bias circuit recited in claim 16, and further comprising an ON/OFF feature, wherein said ON/OFF feature comprises apparatus to disable said coreless transformer and thus the control circuit located on the output side in response to a signal initiated on the input side.

19. The bias circuit recited in claim 16, and further comprising apparatus to disable said coreless transformer and thus said control circuit in response to a signal initiated on the output side.

20. The bias circuit recited in claim 16, wherein the enable signal is a single pulse of predetermined duration.

21. The bias circuit recited in claim 16, wherein the enable signal is a train of pulses of predetermined duration and predetermined period.

22. The bias circuit recited in claim 21, wherein the predetermined duration of each said pulse in the enable signal is short compared with the period of the pulses.

23. The bias circuit recited in claim 16, wherein the enable signal is a single pulse, the duration of which is determined by the time from the commencement of the enable signal until said converter commences operating.

24. The bias circuit recited in claim 23, wherein the enable signal has a predetermined inactive period following the duration of the single pulse.

25. The bias circuit recited in claim 17, wherein said oscillator operates continuously at a reduced frequency after a predetermined time.

26. The bias circuit recited in claim 17, wherein said oscillator operates continuously at a reduced frequency after said converter commences operating.

27. The bias circuit recited in claim 16, wherein the voltage is reduced after a predetermined time.

28. The bias circuit recited in claim 16, wherein the voltage is reduced after said converter commences operating.

29. A method to provide an initial bias and an enable signal for a control circuit (controller) on the output side of a power converter having an input side, by use of a coreless transformer, the method comprising:
providing the coreless transformer fabricated in or on the layers of a printed circuit board;
providing the controller, the controller controlled from output side of the converter;
providing a controller transformer to transmit control power to power the input (primary) side of the power converter;
driving the coreless transformer using high frequency pulses of short duration; and
powering the controller using the coreless transformer.

30. A bias circuit used in a switch-mode power converter having an input and an output side, the bias circuit providing an initial bias and an enable signal for a control circuit (controller) located on the output side of the switch-mode power converter, the bias circuit comprising:
an isolated coreless transformer, the transformer having windings formed in or on layers of a printed circuit board (PCB);
a driver coupled to the transformer to drive said coreless transformer, the driver comprising an oscillator that generates high frequency pulses, the driver to drive the careless transformer in response to the output of the oscillator, to generate pulses of predetermined duration followed by a relatively long inactive period;
a rectifier coupled to the rectifier to provide positive pulses at the output of said coreless transformer;
a capacitor coupled to the rectifier to smooth the rectified positive pulses into the enable signal, and providing the smoothed rectified pulses as the enable signal to generate a voltage to enable the controller located on the output side of said switch-mode power converter.

31. A bias circuit used in switch-mode power converters having an input and an output side, the bias circuit providing an initial bias and an enable signal for a control circuit (controller) located on the output side of the switch-mode power converter, the bias circuit comprising:
an isolated coreless transformer, the transformer having windings formed in or on layers of a printed circuit board (PCB);
driving means for generating high frequency pulses of predetermined duration followed by a relatively long inactive period for driving the coreless transformer, the driving means comprising an oscillator means for generating the pulses, wherein the pulses are of short duration;
rectifier means for providing positive pulses at the output of said coreless transformer;
capacitor means for smoothing the rectified positive pulses, the smoothed rectified pulses for enabling the controller located on the output side of said switch-mode power converter.

* * * * *